No. 771,357. PATENTED OCT. 4, 1904.
G. F. DICKSON.
CONFECTIONERY DIPPING APPARATUS.
APPLICATION FILED FEB. 25, 1904.
NO MODEL. 3 SHEETS—SHEET 1.

Attest:
John Enders
M. H. Holmes

Inventor:
George F. Dickson,
by Robert Burns
Attorney

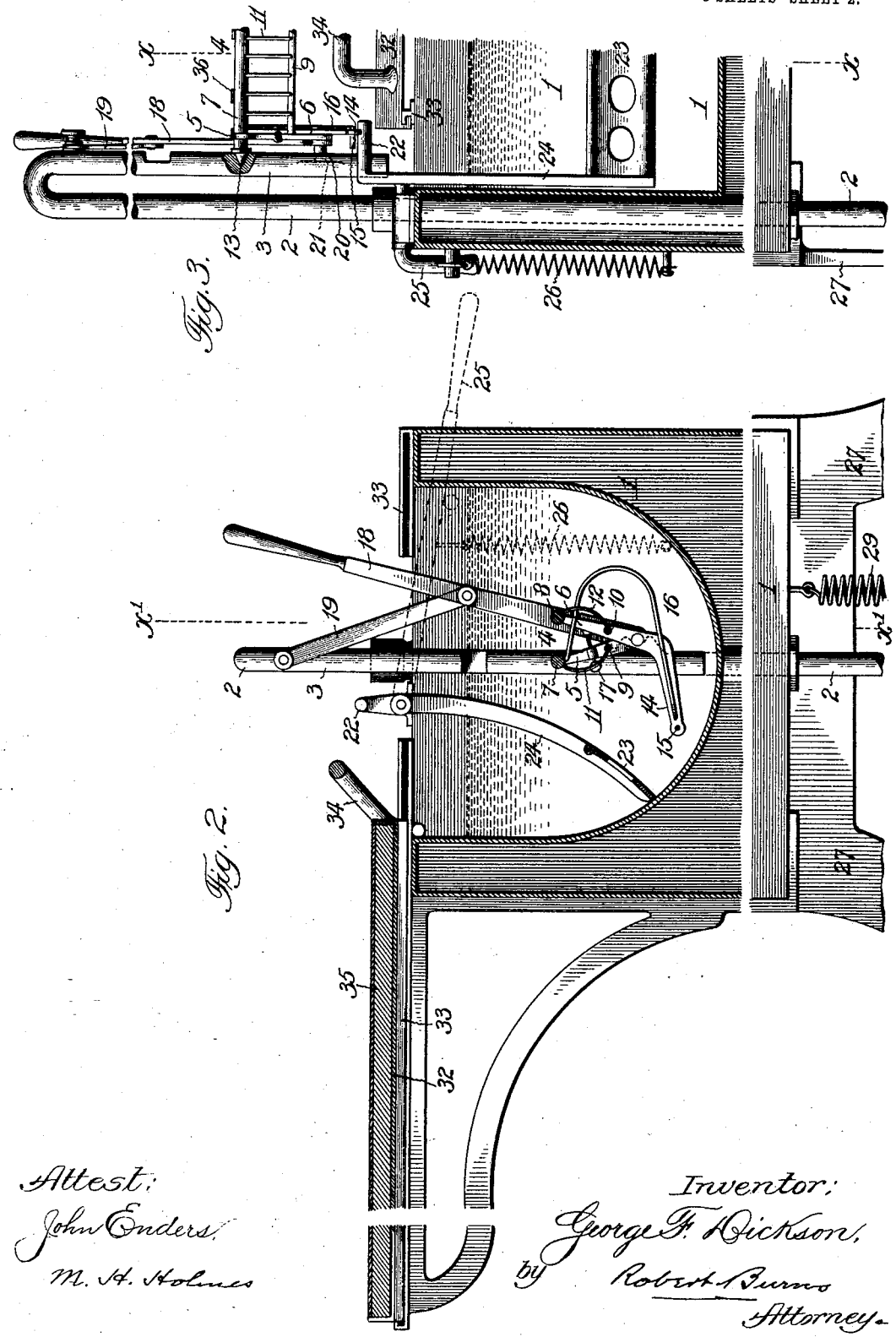

No. 771,357. PATENTED OCT. 4, 1904.
G. F. DICKSON.
CONFECTIONERY DIPPING APPARATUS.
APPLICATION FILED FEB. 25, 1904.
NO MODEL. 3 SHEETS—SHEET 3.

Attest:
John Enders
M. A. Holmes

Inventor:
George F. Dickson
by Robert Burns
Attorney

No. 771,357.                                              Patented October 4, 1904.

UNITED STATES PATENT OFFICE.

GEORGE F. DICKSON, OF CHICAGO, ILLINOIS.

CONFECTIONERY-DIPPING APPARATUS.

SPECIFICATION forming part of Letters Patent No. 771,357, dated October 4, 1904.

Application filed February 25, 1904. Serial No. 195,141. (No model.)

*To all whom it may concern:*

Be it known that I, GEORGE F. DICKSON, a citizen of the United States of America, and a resident of Chicago, in the county of Cook and State of Illinois, have invented certain new and useful Improvements in Confectionery-Dipping Apparatus, of which the following is a specification.

The present invention relates to dipping apparatus for chocolate drops and other similar articles, and has for its object to provide a simple and efficient dipping apparatus by which the coating operation is attained in a ready, rapid, and very efficient manner, all as will hereinafter more fully appear and be more particularly pointed out in the claims.

Figure 1:
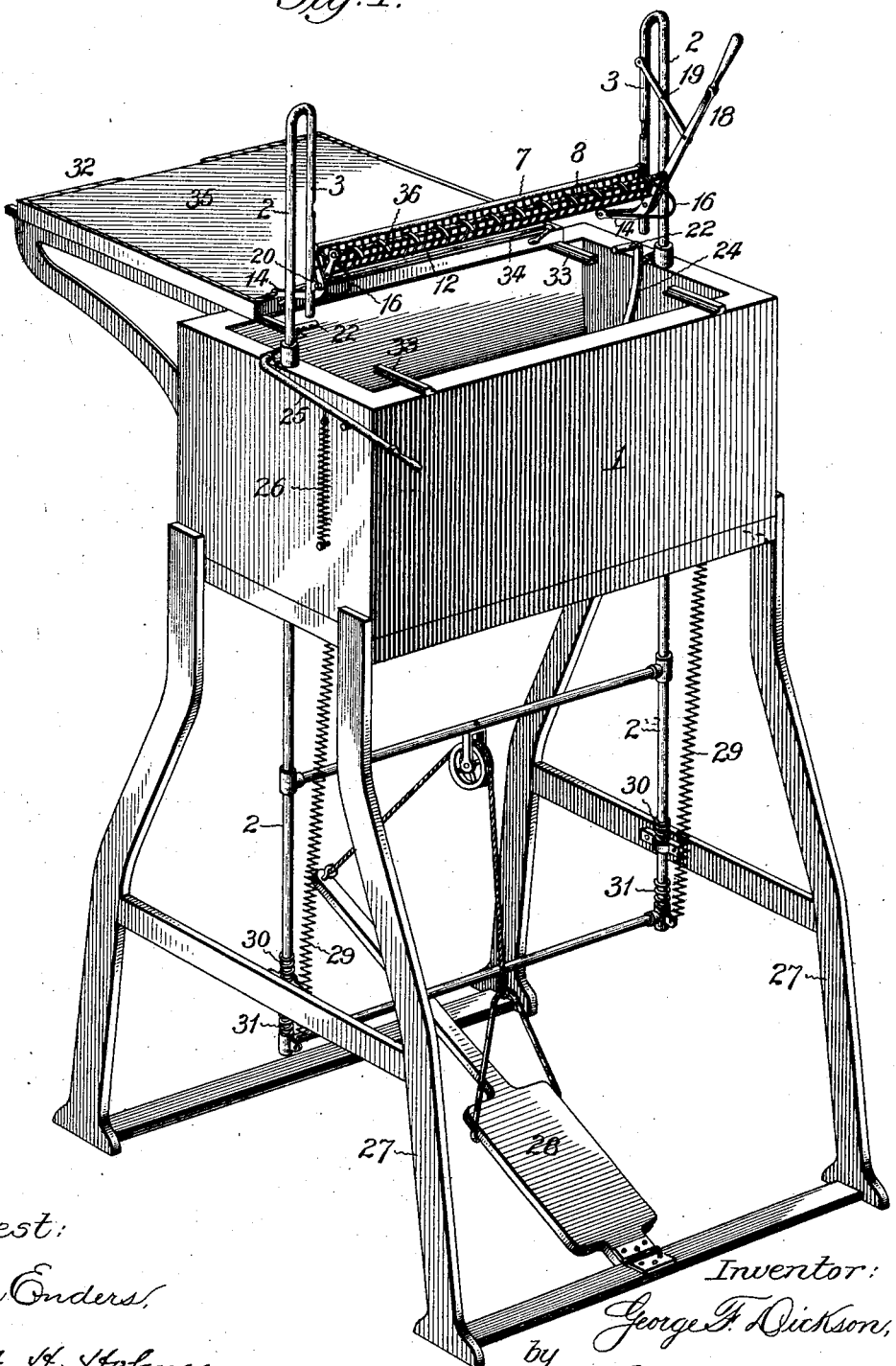
Figure 4:
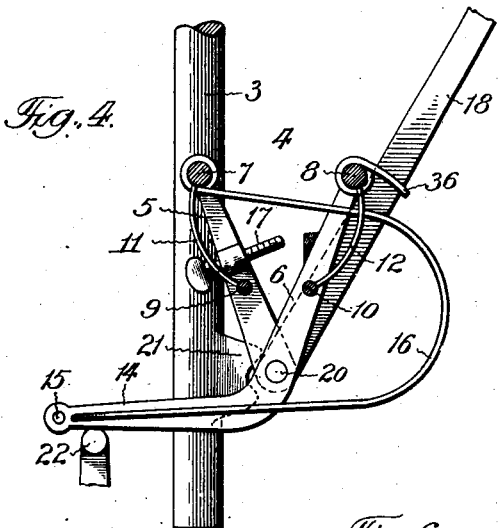
Figure 5:
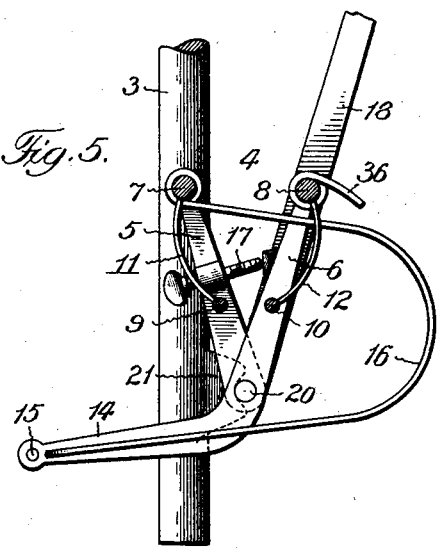
Figure 6:
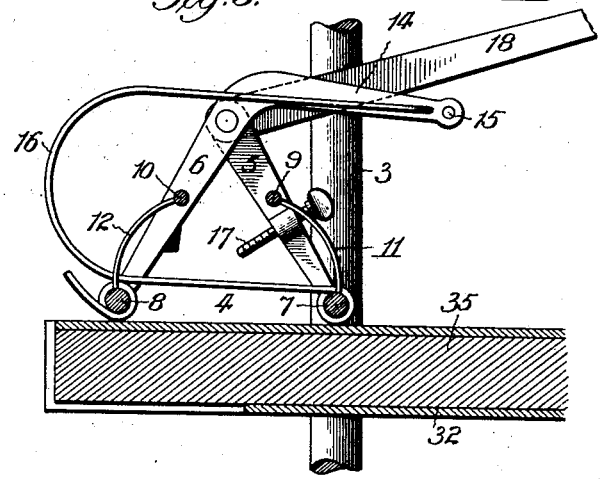
Figure 7:
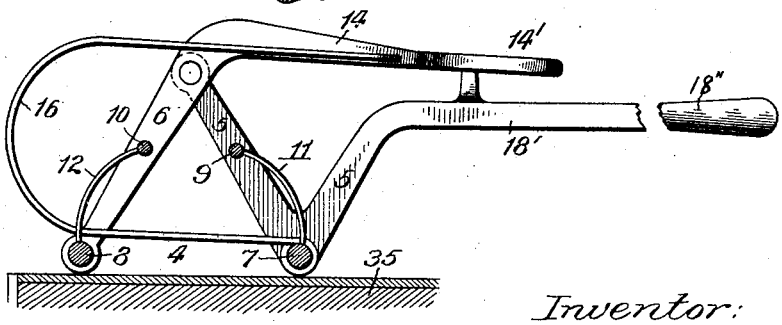

In the accompanying drawings, illustrative of the present invention, Figure 1 is a perspective view illustrating the general construction and structural arrangement of the present apparatus. Fig. 2 is a detail vertical section at line $x\,x$, Fig. 3, in a charging position ready to receive the cream or other drops to be dipped. Fig. 3 is a fragmentary transverse section of the same at line $x'\,x$, Fig. 2. Fig. 4 is an enlarged detail section illustrating the dipping-basket in an opened condition for the reception of the articles to be dipped. Fig. 5 is a similar view illustrating the closed condition of the dipping-basket. Fig. 6 is a similar view illustrating the inverted and open condition of the dipping-basket in discharging the dipped articles onto a receiving-pallet. Fig. 7 is a sectional elevation of the present basket construction arranged as a hand dipping implement.

Similar numerals of reference indicate like parts in the several views.

Referring to the drawings, 1 represents an open-top dipping-tank for containing a supply of melted chocolate or other like fluid into which the cream or other drops are to be dipped, and such tank is provided with the usual outer jacket forming a heating-chamber in which the temperature required to keep the chocolate in proper fluid condition is maintained in any usual and suitable manner.

2 is the carrying-frame for the dipping-basket of the present invention and to which frame movement is imparted to immerse the dipping-basket into the melted chocolate or other coating fluid in the dipping-tank 1. Such carrying-frame is preferably arranged to have a vertical reciprocation in suitable guides at the respective ends of the tank 1 and on the end standards or legs by which said tank is supported, and such frame in the construction shown comprises a pair of separated vertical bars formed with vertically-depending members 3 at their upper ends and to which the respective ends of dipping-basket are connected, as hereinafter described. At their lower ends said vertical bars are connected together by horizontal connecting-bars, so as to have uniform and simultaneous vertical movement.

4 is the dipping-basket heretofore referred to, and which in the present invention comprises component parts, as follows:

5 and 6 are end links or arms pivotally connected together in pairs with their free ends adapted to move to and from each other.

7 and 8 are a pair of longitudinal bars or rails carried by the free ends of the aforesaid links 5 and 6 to constitute the rigid side margins or borders of the dipping-basket. The scope of this part of the present invention involves the formation of the body portion of the dipping-basket of any usual and suitable flexible open-mesh structure, of wire or other material, and the attachment of the same to the margin bars or rails 7 and 8 aforesaid. The preferred construction of such body portion is as follows:

9 and 10 are a pair of secondary bars or rails carried by the end links 5 and 6 aforesaid in separated and parallel relation to the pair of margin bars or rails 7 and 8 and connected thereto by individual sections 11 and 12, of open-mesh flexible wire fabric or grating, the whole constituting a dipping-basket formed in two longitudinal halves that are adapted to close together and spread apart in the cycle of operations of the present apparatus.

13 designates end pins or trunnions at the respective ends of the margin bar or rail 7 aforesaid and having engagement in pivot-sockets in the vertical depending members 3 of the carrying-frame aforesaid and so that the dipping-basket as a whole may have a pivotal or turning movement with said pins as the axis of such movement.

14 is an angular toe or extension at the lower end of one of the links, 6, aforesaid, and such toe is provided at its free end with a lateral stud or projection 15 for purposes hereinafter stated.

16 is a curved spring attached at one end to the margin bar or rail 7 and at the other end to the toe or extension 14, with a yielding tendency to maintain the basket halves heretofore described in a normally closed together condition.

17 is a regulating-screw screwing through one of the links, 6, aforesaid and forming an adjustable stop or abutment for the other link, 7, to limit the extent of closure of the basket halves together and for the purpose of preventing the softer form of cream drops from being crushed by too great a closure of such basket halves.

18 is an operating hand-lever pivotally attached to the pivot-pin of the end links or arms 5 and 6 aforesaid with its free end projecting upwardly into convenient reach of the operator.

19 is a fulcrum-link pivotally connected at one end to the hand-lever 18 intermediate the length of such lever and at its other end to one of the vertically-depending members 3 of the carrying-frame aforesaid by a pivot bolt or stud, as shown. The construction is such that the operator can by manipulating the hand-lever 18 pivotally tip or turn the dipping-basket from a receiving and dipping position to a depositing position, and vice versa, as hereinafter more fully described.

20 designates lateral extensions of the pivot-pins by which the pairs of links or arms 5 and 6 are connected together.

21 designates stirrup-lugs on the sides of the vertically-depending members 3 of the carrying-frame, which lugs are adapted to receive the impact of the lateral pin extensions 20 when the operator by a manipulation of the hand-lever 18 draws the dipping-basket carrying said pin extensions 20 in a direction away from the said stirrup-lugs and then causes a sudden return of the basket to bring the pin extensions 20 in forcible contact with said stirrup-lugs 21, which action causes a jarring of the basket and its contents to remove any surplus dipping solution from the articles just dipped, 22 is a stop arm or finger arranged in the path of the angular toe or extension 14, before described, and which is adapted in the initial downward movement of the dipping-basket to contact with said toe 14 to cause the basket to open, so as to receive the drops to be dipped, and which stop-arm 22 in an upward travel of the basket has a like engagement with the toe 14 to cause a swinging motion of the basket with a view to aid in the removal of more or less of the surplus of the dipping fluid from the contents of the basket as it rises from the dipping fluid. Said stop-arm 22 may be a feature of the top of the dipping-tank 1. It is preferable to make it a part of the carrying-frame of the agitator-blade by which the contents of the dipping-tank is agitated from time to time.

23 is the longitudinal perforated agitator-blade arranged within the dipping-tank and carried by vibratory arms 24, journaled at the top of the dipping-tank. The stop-arm 22, above described, forms an extension of one of the vibratory arms 24 in the preferred form of the present invention, in that such arrangement admits of the said stop-arm being moved into an inoperative position when required.

25 is an operating hand-lever connected to the vibratory frame 24 aforesaid by the agitator-blade.

26 is a spring connected to the operating-lever 25 and adapted to normally maintain the agitator above described to one side and out of the path of the dipping-basket, as shown in Fig. 2.

27 designates end standards or legs for supporting the dipping-tank at the proper height above the floor for convenient working.

28 is a foot-lever or treadle pivoted to the standard 27 and having operative connection with the carrying-frame 2 to impart positive downward movement to the same.

29 designates one or more springs of any usual form and arrangement adapted to impart an upward movement to the carrying-frame 2 and to maintain the same normally in its raised position when not depressed by the treadle 28.

30 and 31 are upper and lower elastic cushions or buffers against which the carrying-frame 2 impacts as it ends its upward or downward stroke to cause a jarring of such frame and with the purpose, in the one case, to shake the surplus chocolate or other dipping fluid from the drops being dipped and, in the other case, to cause a more intimate contact of said drops with the melted chocolate or other dipping solution.

32 is a horizontal receiving-tray arranged to slide forward and backward with relation to the open top of the dipping-tray 1 and in suitable guides 33, carried by said tank.

34 is a handle on the forward end of the tray 32, by means of which the operator can adjust by hand the position of said tray during the operation of depositing the dipped articles upon the tray.

35 is a removable pallet, of any usual material, fitting the top of the tray 32 and adapted for ready removal when filled and its place supplied with a fresh tray in the continued use of the apparatus.

36 designates flexible wipers secured in separated relation on the longitudinal bars or rails 7 and 8 and which by a manipulation by hand of the dipping-basket when in its depositing position are adapted to wipe the upper surface of the dipped drops upon the pallet 35 to remove wire-marks therefrom or impart a striated appearance thereto.

The scope of the present invention involves the use of the dipping-basket before described as a hand dipping implement, as illustrated in Fig. 7 of the drawings. In such application one of the end links 5 of the dipping-basket will be provided with a shank 18' and a holding-handle 18", while the companion end link 6 of the basket will be provided with a finger-rest 14' at the free end of its extension 14 within convenient reach of the hand of the operator holding the handle 18" aforesaid and so that the finger or thumb of the operator can be used to operate said extension 14 to cause an opening or closing of the basket-halves.

The operation of the apparatus is as follows: Starting with the dipping-basket and its carrying-frame 2 in a normally elevated position above the dipping-tank 1, the operator by means of the foot-lever 28 moves said basket and frame downward against the normal upward tendency of said parts under the influence of the springs 29 and until the angular arm 14 of one of the dipping-basket halves by contact with the stop-arm 22 causes the basket halves to open from the position shown in Fig. 5 of the drawings to that shown in Fig. 4, and by means of the aforesaid foot-lever the operator maintains the basket in such position and open condition while the articles to be dipped are placed between the basket halves. On a further downward movement of the dipping-basket and its carrying-frame, due to a further depression of the foot-lever 28, the angular arm 14 is carried past the stop-arm 22 and the basket halves close together under the influence of the spring 16 upon the articles to be dipped, so as to securely hold the same. With a continued downward movement of the foot-lever the dipping-basket is immersed in the melted chocolate or other fluid in the dipping-tank, and as the carrying-frame 2 reaches the limit of its downward movement it impacts upon the elastic cushions 30 to cause a jarring movement of the dipping-basket to aid in effecting a more thorough surface contact of the dipping fluid with the articles being dipped. With a release of the downward stress of the operator's foot on the foot-lever 28 the dipping-basket and its carrying-frame rise vertically out of the dipping-tank, and in the upward movement of such basket its angular arm 14 contacts with the stop-arm 22 to cause a swinging motion of the basket upon its pivots, and thereby aid in the removal of more or less of the surplus dipping fluid adhering to the basket and its contents as it rises from the dipping fluid, and as the carrying-frame 2 reaches the limit of its upward movement it impacts upon the elastic cushions 31 to effect a jarring movement of the dipping-basket and aid in the further removal of the surplus dipping fluid from the basket and its contents. A still further jarring of the basket at this stage can be effected by a manipulation of the hand-lever 18 to draw the lower ends of the end links 5 and 6 away from the carrying-frame and allowing a sudden return of said links under the influence of the spring 16 and an impact of the pivot-pin 20 with the stirrup 21, as heretofore more fully set forth in the body of the specification.

The receiving-tray 32 is now drawn by hand beneath the dipping-basket, after which the basket is inverted by means of the hand-lever 18, as heretofore described. At the same time the operator's foot is employed to depress the foot-lever 28 to bring the dipping-basket in the described inverted condition down upon the pallet 35 of the tray 32, after which the operator by further manipulation of the hand-lever 18 brings said lever against lateral projection 15 of the toe or extension 14 to force the basket halves apart and deposit the dipped articles upon the pallet aforesaid. Immediately following such last operation the wipers 36 can by a manipulation of the hand-lever 18 and foot-lever 28 in conjunction be drawn over the surface of the dipped articles to impart to the surface of the dipped drops a fancy line effect. The basket is again reversed and the parts allowed to return to the position initially described.

Having thus fully described my said invention, what I claim as new, and desire to secure by Letters Patent, is—

1. A dipping-basket for chocolate drops and the like, comprising a pair of longitudinal basket halves connected together with their opposed longitudinal margins adapted to move to and from each other, means for regulating the degree of closure of the basket halves together, and means for imparting movement to the opposed margins of the basket halves, substantially as set forth.

2. A dipping-basket for chocolate drops and the like, comprising a pair of longitudinal basket halves connected together with their opposed longitudinal margins adapted to move to and from each other, yielding means for holding the basket halves together, means for regulating the degree of closure of the basket halves, and means for imparting an opening movement to the same, substantially as set forth.

3. A dipping-basket for chocolate drops and the like, comprising a pair of longitudinal marginal rails movable to and from each other, a perforate basket-body carried by said rails, and means for imparting movement to said rails to and from each other, substantially as set forth.

4. A dipping-basket for chocolate drops and the like, comprising a pair of longitudinal marginal rails movable to and from each other, a perforate basket-body carried by said rails, means for regulating the degree of closure together of the rails, and means for imparting movement to the rails to and from each other, substantially as set forth.

5. A dipping-basket for chocolate drops and the like, comprising a pair of longitudinal marginal rails movable to and from each other, a perforate basket-body carried by said rails, a spring tending to move said rails together, means for regulating the degree of closure together of the rails, and means for moving said rails apart, substantially as set forth.

6. A dipping-basket for chocolate drops and the like, comprising a pair of longitudinal marginal rails movable to and from each other, a perforate basket-body carried by said rails, end links pivotally connected together in pairs with their free ends connected to the ends of said rails, and means for imparting movement to said rails to and from each other, substantially as set forth.

7. A dipping-basket for chocolate drops and the like, comprising a pair of longitudinal marginal rails movable to and from each other, a perforate basket-body carried by said rails, end links pivotally connected together in pairs with their free ends connected to the ends of said rails, a spring tending to move said rails together, and means for moving said rails apart, substantially as set forth.

8. A dipping-basket for chocolate drops and the like, comprising a pair of longitudinal marginal rails movable to and from each other, a perforate basket-body carried by said rails, end links pivotally connected together in pairs with their free ends connected to the ends of said rails, means for regulating the degree of closure together of the rails, and means for imparting movement to the rails to and from each other, substantially as set forth.

9. A dipping-basket for chocolate drops and the like, comprising a pair of longitudinal marginal rails movable to and from each other, a perforate basket-body carried by said rails, end links pivotally connected together in pairs with their free ends connected to the ends of said rails, a spring tending to move said rails together, means for regulating the degree of closure together of said rails, and means for moving said rails apart, substantially as set forth.

10. A dipping-basket for chocolate drops and the like, comprising a pair of basket halves formed by a pair of longitudinal marginal rails, a pair of secondary rails in separated relation to the marginal rails, sections of open-mesh fabric or grating connecting the marginal and secondary rails together and end links pivotally connected together in pairs and supporting the rails aforesaid, and means for imparting movement to one basket half to and from the other half, substantially as set forth.

11. A dipping-basket for chocolate drops and the like, comprising a pair of basket halves formed by a pair of longitudinal marginal rails, a pair of secondary rails in separated relation to the marginal rails, sections of open-mesh fabric or grating connecting the marginal and secondary rails together and end links pivotally connected together in pairs and supporting the rails aforesaid, a spring tending to move the basket halves together, and means for moving the basket halves apart, substantially as set forth.

12. A dipping-basket for chocolate drops and the like, comprising a pair of basket halves formed by a pair of longitudinal marginal rails, a pair of secondary rails in separated relation to the marginal rails, sections of open-mesh fabric or grating connecting the marginal and secondary rails together and end links pivotally connected together in pairs and supporting the rails aforesaid, and means for regulating the closure together of the basket halves, and means for imparting movement to the basket halves to and from each other, substantially as set forth.

13. A dipping-basket for chocolate drops and the like, comprising a pair of basket halves formed by a pair of longitudinal marginal rails, a pair of secondary rails in separated relation to the marginal rails, sections of open-mesh fabric or grating connecting the marginal and secondary rails together, and end links pivotally connected together in pairs and supporting the rails aforesaid, a spring tending to move the basket halves together, means for regulating the closure together of the basket halves, and means for moving one basket half away from the other half, substantially as set forth.

14. In a dipping apparatus for chocolate drops and the like, the combination of an open-top dipping-tank, a vertically-moving dipping-frame, a dipping-basket pivotally attached to said frame and comprising a pair of longitudinal basket halves connected together with their opposed longitudinal margins adapted to move to and from each other, and means for imparting movement to said opposed margins, substantially as set forth.

15. In a dipping apparatus for chocolate drops and the like, the combination of an open-top dipping-tank, a vertically-moving dipping-frame, a dipping-basket pivotally attached to said frame and comprising a pair of longitudinal basket halves connected together with their opposed longitudinal margins adapted to move to and from each other, yielding means for holding the basket halves together, and means for imparting an opening movement to the same substantially as set forth.

16. In a dipping apparatus for chocolate drops and the like, the combination of an open-top dipping-tank, a vertically-moving dipping-frame, a dipping-basket pivotally attached to said frame and comprising a pair of longitudinal halves connected together with their opposed longitudinal margins adapted to move to and from each other, means for regulating the degree of closure of the basket halves together, and means for imparting movement to the opposed margins of the basket halves, substantially as set forth.

17. In a dipping apparatus for chocolate drops and the like, the combination of an open-top dipping-tank, a vertically-moving dipping-frame, a dipping-basket pivotally attached to said frame and comprising a pair of longitudinal halves connected together with their opposed longitudinal margins adapted to move to and from each other, yielding means for holding the basket halves together, means for regulating the degree of closure of the basket halves, and means for imparting an opening movement to the same, substantially as set forth.

18. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, and means for imparting movement to said rails to and from each other substantially as set forth.

19. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, a spring tending to move said rails together, and means for moving said rails apart, substantially as set forth.

20. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, means for regulating the degree of closure together of the rails and means for imparting movement to the rails to and from each other, substantially as set forth.

21. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, a spring tending to move said rails together, means for regulating the degree of closure together of the rails, and means for moving said rails apart, substantially as set forth.

22. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, end links pivotally connected together in pairs with their free ends connected to the ends of said rails, and means for imparting movement to said rails to and from each other, substantially as set forth.

23. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, end links pivotally connected together in pairs with their free ends connected to the ends of said rails, a spring tending to move said rails together, and means for moving said rails apart, substantially as set forth.

24. In a dipping apparatus for chocolate drops and the like, the combination of an open-top dipping-tank, a vertically-moving dipping-frame, a dipping-basket pivotally attached to said frame and comprising a pair of longitudinal rails movable to and from each other, a perforate basket-body carried by said rails, end links pivotally connected together in pairs with their free ends connected to the ends of the rails, means for regulating the degree of closure together of the rails, and means for imparting movement to the rails to and from each other, substantially as set forth.

25. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, end links pivotally connected together in pairs with their free ends connected to the ends of the rails, a spring tending to move said rails together, means for regulating the degree of closure together of said rails, and means for moving said rails apart, substantially as set forth.

26. In a dipping apparatus for chocolate drops and the like, the combination of an open-top dipping-tank, a vertically-moving dipping-frame, a dipping-basket pivotally attached to said frame and comprising a pair of basket halves formed by a pair of longitudinal marginal rails, a pair of secondary rails in separated relation to the marginal rails, sections of open-mesh fabric or grating connecting the marginal and secondary rails together and end links pivotally connected together in pairs and supporting the rails aforesaid, and means for imparting movement to one basket half to and from the other half, substantially as set forth.

27. In a dipping apparatus for chocolate drops and the like, the combination of an open-top dipping-tank, a vertically-moving dipping-frame, a dipping-basket pivotally attached to said frame and comprising a pair of basket halves formed by a pair of longitudinal marginal rails, a pair of secondary rails in separated relation to the marginal rails, sections of the open-mesh fabric or grating connecting the marginal and secondary rails together and end links pivotally connected together in pairs and supporting the rails aforesaid, a spring tending to move the basket halves together, and means for moving the basket halves apart, substantially as set forth.

28. In a dipping apparatus for chocolate drops and the like, the combination of an open-top dipping-tank, a vertically-moving dipping-frame, a dipping-basket pivotally attached to said frame and comprising a pair of basket halves formed by a pair of longitudinal marginal rails, a pair of secondary rails in separated relation to the marginal rails, sections of open-mesh fabric or grating connecting the marginal and secondary rails together and end links pivotally connected together in pairs and supporting the rails aforesaid, means for regulating the closure together of the basket halves, and means for imparting movement to the basket halves to and from each other, substantially as set forth.

29. In a dipping apparatus for chocolate drops and the like, the combination of an open-top dipping-tank, a vertically-moving dipping-frame, a dipping-basket pivotally attached to said frame and comprising a pair of basket halves formed by a pair of longitudinal marginal rails, a pair of secondary rails in separated relation to the marginal rails, sections of open-mesh fabric or grating connecting the marginal and secondary rails together and end links pivotally connected together in pairs and supporting the rails aforesaid, a spring tending to move the basket halves together, means for regulating the closure together of the basket halves, and means for moving one basket half away from the other, substantially as set forth.

30. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, a spring tending to move said rails together, and means for moving said rails apart, the same comprising an angular arm connected to one of said rails and a stop-arm on the dipping-tank, substantially as set forth.

31. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, end links pivotally connected together in pairs with their free ends connected to the ends of said rails, a spring tending to move said rails together, and means for moving said rails apart, the same comprising an angular arm on one of the end links, and a stop-arm on the dipping-tank, substantially as set forth.

32. In a dipping apparatus for chocolate drops and the like, the combination of an open-top dipping-tank, a vertically-moving dipping-frame, a dipping-basket pivotally attached to said frame and comprising a pair of basket halves formed by a pair of longitudinal marginal rails, a pair of secondary rails in separated relation to the marginal rails, sections of open-mesh fabric or grating connecting the marginal and secondary rails together and end links pivotally connected together in pairs and supporting the rails aforesaid, a spring tending to move the basket halves together, and means for moving the basket halves apart, the same comprising an angular arm on one of the end links and a stop-arm on the dipping-tank, substantially as set forth.

33. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, a spring tending to move said rails together, and means for moving said rails apart, the same comprising an angular arm connected to one of said rails, and a hand-operated stirrer in the dipping-tank provided at the upper end with a stop-arm normally in the path of the angular arm, substantially as set forth.

34. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, end links pivotally connected together in pairs with their free ends connected to the ends of said rails, a spring tending to move said rails together, and means for moving said rails apart, the same comprising an angular arm connected to one of said rails, and a hand-operated stirrer in the dipping-tank provided at its upper end with a stop-arm normally in the path of the angular arm, substantially as set forth.

35. In a dipping apparatus for chocolate drops and the like, the combination of an open-top dipping-tank, a vertically-moving dipping-frame, a dipping-basket pivotally attached to said frame and comprising a pair of basket halves formed by a pair of longitudinal marginal rails, a pair of secondary rails in separated relation to the marginal rails, sections of open-mesh fabric or grating connecting the marginal and secondary rails together and end links pivotally connected together in pairs and supporting the rails aforesaid, a spring tending to move the basket halves together, and means for moving the basket halves apart, the same comprising an angular arm on one of the end links, and a hand-operated stirrer in the dipping-tank provided at its upper end with a stop-arm normally in the path of the angular arm, substantially as set forth.

36. In a dipping apparatus for chocolate drops and the like, the combination of an open-top dipping-tank, a vertically-moving dipping-frame, a dipping-basket pivotally attached to said frame and comprising a pair of longitudinal basket halves connected together with their opposed longitudinal margins adapted to move to and from each other, means for imparting movement to said opposed margins, and a receiving-tray adapted to have a sliding movement above the dipping-tank, substantially as set forth.

37. In a dipping apparatus for chocolate drops and the like, the combination of an open-top dipping-tank, a vertically-moving dipping-frame, a dipping-basket pivotally attached to said frame and comprising a pair of longitudinal basket halves connected together with their opposed longitudinal margins adapted to move to and from each other, means for imparting movement to said opposed margins, a spring tending to hold the dipping-frame in an elevated position, and a foot-lever for depressing said frame, substantially as set forth.

38. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, means for imparting movement to said rails to and from each other, and means for inverting the dipping-basket, the same comprising a hand-lever pivotally connected to the basket, and to the dipping-frame by a radius-link, substantially as set forth.

39. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, end links pivotally connected together in pairs with their free ends connected to the ends of said rails, means for imparting movement to said rails to and from each other, and means for inverting the dipping-basket, the same comprising a hand-lever pivotally connected to the pivot-pin of a pair of end links aforesaid and to the dipping-frame by a radius-link, substantially as set forth.

40. In a dipping apparatus for chocolate drops and the like, the combination of an open-top dipping-tank, a vertically-moving dipping-frame, a dipping-basket pivotally attached to said frame and comprising a pair of basket halves formed by a pair of longitudinal marginal rails, a pair of secondary rails in separated relation to the marginal rails, sections of open-mesh fabric or grating connecting the marginal and secondary rails together and end links pivotally connected together in pairs and supporting the rails aforesaid, means for imparting movement to one basket half, to and from the other half, and means for inverting the dipping-basket, the same comprising a hand-lever pivotally connected to the pivot-pin of a pair of end links aforesaid and to the dipping-frame by a radius-link, substantially as set forth.

41. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, means for imparting movement to said rails to and from each other, and means for jarring the dipping-basket, the same comprising stirrup-lugs on the side of the dipping-frame and projecting pins at the ends of the basket, substantially as set forth.

42. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, end links pivotally connected together in pairs with their free ends connected to the ends of said rails, means for imparting movement to said rails to and from each other, and means for jarring the dipping-basket, the same comprising stirrup-lugs on the side of the dipping-frame and projecting pins at the ends of the basket, substantially as set forth.

43. In a dipping apparatus for chocolate drops and the like, the combination of an open-top dipping-tank, a vertically-moving dipping-frame, a dipping-basket pivotally attached to said frame and comprising a pair of basket halves formed by a pair of longitudinal marginal rails, a pair of secondary rails in separated relation to the marginal rails, sections of open-mesh fabric connecting the marginal and secondary rails together and end links pivotally connected together in pairs and supporting the rails aforesaid, means for imparting movement to one basket half to and from the other half, and means for jarring the dipping-basket, the same comprising stirrup-lugs on the side of the dipping-frame, and projecting pins at the ends of the basket, substantially as set forth.

44. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, means for inverting the dipping-basket, the same comprising a hand-lever pivotally attached to the basket and to the dipping-frame by a radius-link, and means for effecting an opening of the dipping-basket while inverted, the same comprising a projecting lug on one half of the basket and arranged in the path of the hand-lever aforesaid, substantially as set forth.

45. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, end links pivotally connected together in pairs with their free ends connected to the ends of said rails, means for inverting the dipping-basket, the same comprising a hand-lever pivotally connected to the pivot-pin of a pair of end links aforesaid and to the dipping-frame by a radius-link, and means for effecting an opening of the dipping-basket while inverted, the same comprising a projecting lug on one half of the basket and arranged in the path of the hand-lever aforesaid, substantially as set forth.

46. In a dipping apparatus for chocolate drops and the like, the combination of an open-top dipping-tank, a vertically-moving dipping-frame, a dipping-basket pivotally attached to said frame and comprising a pair of basket halves formed by a pair of longitudinal marginal rails, a pair of secondary rails in separated relation to the marginal rails, sections of open-mesh fabric or grating connecting the marginal and secondary rails together and end links pivotally connected together in pairs and supporting the rails aforesaid, means for inverting the dipping-basket, the same comprising a hand-lever pivotally connected to the pivot-pin of a pair of end links aforesaid, and to the dipping-frame by a radius-link, and means for effecting an opening of the dipping-basket while inverted, the same comprising a projecting lug on one basket half and arranged in the path of the hand-lever aforesaid, substantially as set forth.

47. In a dipping apparatus for chocolate drops and the like, the combination of an open-top dipping-tank, a vertically-moving dipping-frame, a dipping-basket pivotally attached to said frame and comprising a pair of longitudinal marginal rails movable to and from each other, a perforate basket-body carried by said rails, means for imparting movement to said rails to and from each other, and a series of flexible wipers carried by one of the marginal rails, substantially as set forth.

Signed at Chicago, Illinois, this 23d day of February, 1904.

GEORGE F. DICKSON.

Witnesses:
ROBERT BURNS,
M. H. HOLMES.